April 18, 1961 D. W. REED 2,980,184
METHOD AND APPARATUS FOR PRODUCING WELLS
Filed Sept. 22, 1958 2 Sheets-Sheet 1

HEAT EXCHANGER

INVENTOR:
DAVIS W. REED
BY: J. H. McCarthy
HIS AGENT

April 18, 1961 D. W. REED 2,980,184
METHOD AND APPARATUS FOR PRODUCING WELLS
Filed Sept. 22, 1958 2 Sheets-Sheet 2

INVENTOR:
DAVIS W. REED
BY: J. H. McCarthy
HIS AGENT

United States Patent Office 2,980,184
Patented Apr. 18, 1961

2,980,184
METHOD AND APPARATUS FOR PRODUCING WELLS
Davis W. Reed, Ventura, Calif., assignor to Shell Oil Company, a corporation of Delaware
Filed Sept. 22, 1958, Ser. No. 762,634
2 Claims. (Cl. 166—57)

The present invention relates to the production of oil from subsurface producing formations by means of a producing well and pertains more particularly to a method and apparatus for increasing the production of oil from a well of low productivity which is being produced by means of a pump.

The invention has particular application in the production of oil from reservoirs whose productivity may be increased by heating the producing formation, for example, with a bottomhole heater, expecially in those cases where the normal installation of a bottomhole heater is unable to heat the entire oil-producing formamation. For example, in some oil fields the wells have such a low productivity that a pump must be located near the bottom of the well and the well pumped off, or the fluid level within the well kept pumped down to a low level so as to prevent the accumulation in the bottom of the well of a column of well fluid which would build up a back pressure on the producing zone and thus impair the flow of formation fluid into the well.

In the normal heating of a well, a bottomhole well heater heats the column of fluid in the bottom of the well adjacent the producing formation which in turn heats the adjacent formation, thus reducing the viscosity of the oil and facilitating its flow into the well. However, in wells of low productivity where there is a column of well fluid only at the bottom of the well, the major portion of the producing formation above the level of the well fluid is not exposed to the hot oil and is only exposed to the vapors and gases in the well above the level of the well fluid. Since these vapors and gases in the well have little heating value, it may be seen that it is often uneconomical to employ a downhole well heater in a well of low productivity.

This invention is also concerned with the production of oil from reservoirs containing substantial amounts of heavy oils and even fractions such as paraffin in a condition of unstable solutions such that precipitation tends to occur in the formation surrounding the wellbore as the liquid is produced, thereby progressively constricting the minute interstices of the formation.

The primary object of the present invention is to provide a method and apparatus for increasing the production of oil from wells of low productivity.

Another object of the present invention to to provide an improved apparatus for efficiently heating oil-bearing sands with a bottomhole immersion-type well heater.

A further object of the present invention is to provide method and apparatus for heating the entire length or interval of an oil-producing zone with a bottomhole immersion-type heater while the level of well fluid within the well is maintained near the bottom of the well.

An additional object of this invention is to provide a method and apparatus for heating efficiently the entire length of an oil-producing formation traversed by a well while permitting well fluid to flow into a borehole that is open and empty over the greater portion of the producing interval.

A still further object of this invention is to provide a method and apparatus for heating and flushing the surface of an oil-producing formation traversed by a well with a portion of the fluid being produced by the well.

Another object of this invention is to provide apparatus adapted to be used in conjunction with a bottomhole well heater for increasing the efficiency of the heater when used in wells of low productivity.

These and other objects of this invention will be understood from the following description taken with reference to the drawing, wherein.

Figure 1:
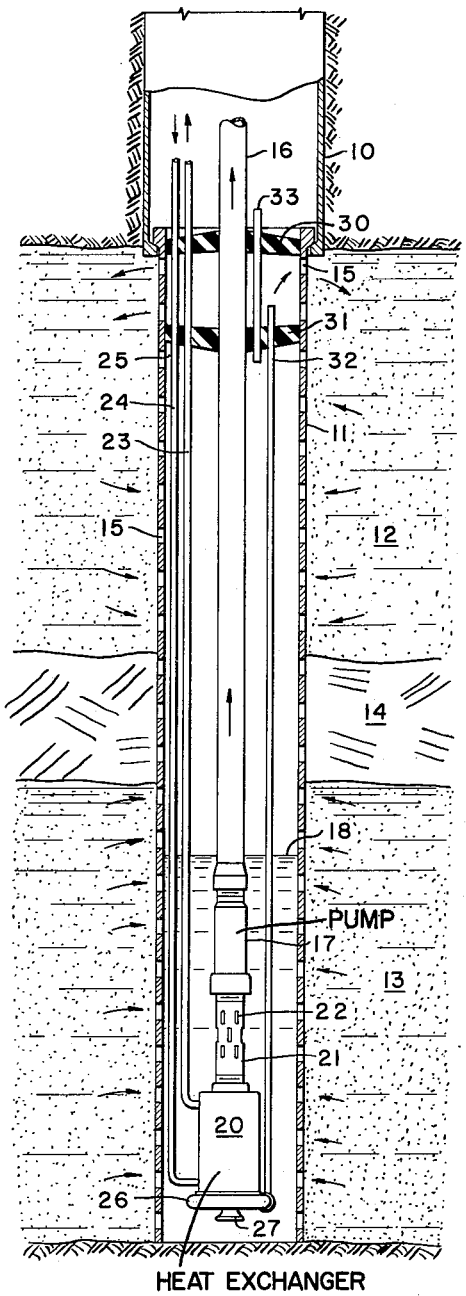
Figures 1 and 4 are diagrammatic views, taken in partial longitudinal cross-section, of the present apparatus illustrated as being positioned at the bottom of a well which traversed two producing formations.

Referring to Figure 1 of the drawing, a well casing 10 having a perforated section or liner 11 extends through two producing formations 12 and 13 which are separated by a shale section 14. The liner 11 is normally hung from the bottom of the casing 10 in a manner well known to the art and may be cemented in place. The liner 11 is provided with a plurality of perforations 15 which admit the flow of well fluid into the well. In the event that the liner is cemented in place, perforations also extend through the cement sheath surrounding the liner 11. While the present apparatus is described herein as being positioned in a well traversing a pair of oil-producing formations 12 and 13, the apparatus may be used with equally good results in a single oil-producing formation.

Suspended within the well casing 10 is a production tubing 16 having a well pump 17, preferably of the reciprocating type, secured to the lower end thereof for pumping well fluid out of the well and up to the surface. The well pump 17 is positioned in the lower of the two oil-producing formations and, in the event that there is only one oil-producing formation, the pump is positioned in the lower part thereof in order to maintain the liquid level within the well down near the bottom thereof.

Disposed within the perforated liner 11 below the pump 17 is a well heater or heat exchanger 20 which is submerged at all times below the liquid level 18 of the well fluid. If desired, the heater or heat exchanger 20 may be fixedly positioned within the liner 11 by securing it to the bottom of the pump 17 as by a short section of pipe 21, or by any other suitable support member. The pipe 21 is provided with a plurality of perforations or fluid ports 22 which allow well fluid to pass into the bottom of the pump 17.

Figure 4:
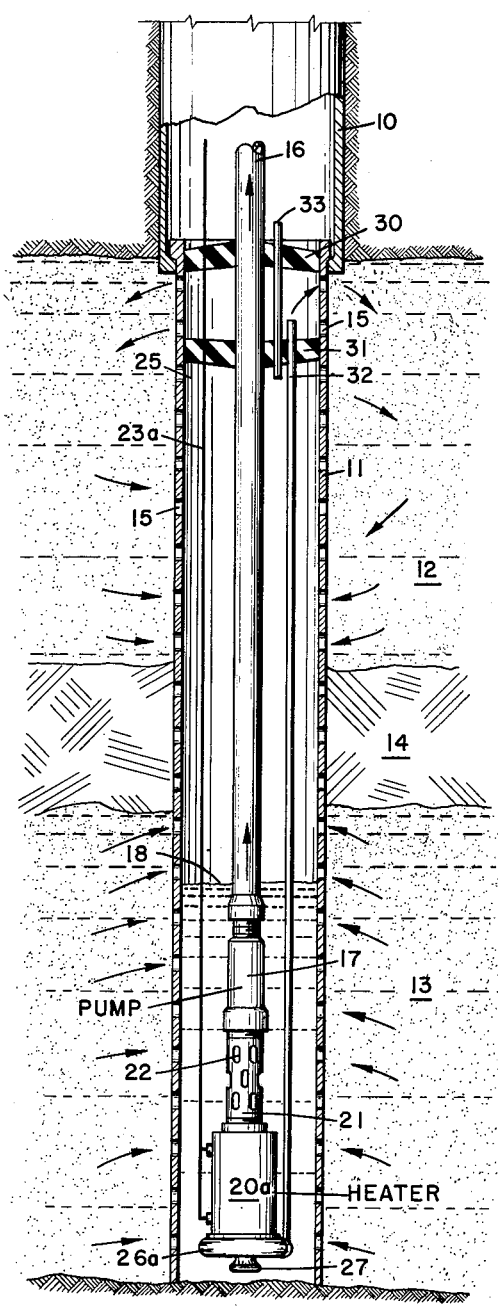

Extending from the surface down to the heat exchanger 20 at the bottom of the well are suitable transmission means, such as, for example, a pair of small-diameter tubing strings 23 and 24 which hang in the annulus 25 between the production tubing 16 and the well casing 10. Hot water may be circulated from a suitable source at the surface (not shown) down through one of the conduits 23 and up the other 24. In the event that an electrical heater 20 is employed, a single electrical transmission cable 23a would replace the tubing strings 23 and 24, with current being supplied through separate leads in the cable 23a to the heater 20a and the pump 26a (Figure 4).

Figure 5:
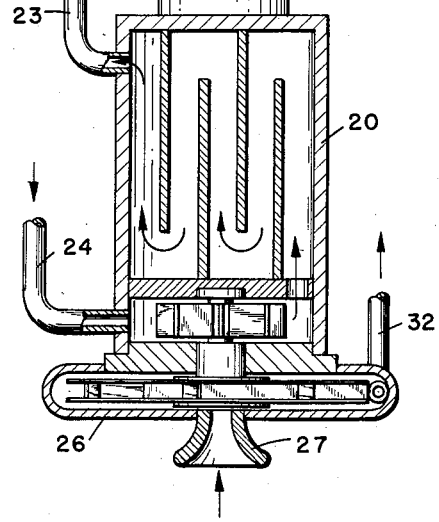
Figure 5 is a diagrammatic view, taken in longitudinal section, of the heater and pump positioned at the bottom of the apparatus illustrated in Figure 1.

Disposed near the bottom of the well adjacent the heater 20 is a recirculating pump 26 of any suitable type having an intake 27 in communication with the heated well fluid in the well. The recirculating pump 26 and heater 20 may be of a construction as shown in Figure 5 or the pump may be of the hydraulically-actuated type manufactured by Byron-Jackson Tool Company and described in the Composite Catalog of Oil Field Equipment, page 1024, vol. 1, 1961 edition. The recirculating pump may be operated by the heated fluids pumped up and down tubings 23 and 24, or alternatively by the power transmission line furnishing current to the electric heater 20. At the same time such an electrical cable may furnish power to drive the recirculating pump 26a (Figure 4) also.

Surrounding the tubing string 16 and effectively closing the annular space 25 between the tubing string 16 and the perforated liner 11 near the top of the producing formation 12 is a double packer assembly 30 and 31. The spacing between the packers 30 and 31 is such that the space between the packers is in communication with the upper portion of the oil-producing formation 12 through at least a few of the perforations 15 in the liner 11. A conduit 32 extends from the discharge of the recirculating pump 26 into the space between the packers 30 and 31. In the event that gas is produced with the oil, or in the event that it is desired to relieve any vapor pressures which may accumulate below the packers 30 and 31, the by-pass conduit 33 may be provided which is in communication with the space above packer 30 and the space below packer 31.

In the operation of the present apparatus it will be assumed that the apparatus is positioned in a well where the normal fluid level within the borehole is maintained in the lower part of the oil-producing formation. The effect of maintaining a low fluid level within the well is twofold. First, the oil zone or zones 12 and 13 are relieved of any fluid back-pressure which would be caused by a column of fluid accumulating in the well, and the absence of any such back pressure facilitates the entry of formation fluids into the borehole. Second, there is no fluid column opposite the upper portion of the oil sand that can be employed as an effective heat transmission medium. In effect, an installation of this type does not permit effective transmission of heat, either by conduction or convection, from the heater to the upper oil sands and, as a consequence, the benefits of heating are not realized in this upper portion of the production interval.

In the method of the present invention, well fluid is pumped from the well at a rate such that a substantial interval of at least one oil-producing formation traversed by the well is not exposed to the column of reservoir fluid in the well, while at the same time the well fluid is heated at the bottom of the well and then circulated up to the top of the oil-producing formation where it is discharged against the face of the oil-producing formation, or into the oil-producing formation, and allow to gravitate through the oil-producing zone and back into the well.

Hot water is pumped down conduit 24 to the recirculating pump 26 and then sent to heater 20 and up tubing 23 to the surface where the water is reheated. Alternatively the flow of fluid through tubings 23 and 24 and pump 26 and heater 20 may be reversed so as to pass through the heater first. The fluid in the borehole is heated by the heater 20 and a portion of this heated fluid enters the intake 27 of pump 26 and is pumped upwardly through conduit 32 into the space between the packers 30 and 31 where it is discharged out perforations 15 into the upper portion of the oil-producing formation. At the same time the other portion of the heated fluid passes through perforations 22 into the bottom of the pump 17 which forces the well fluid up through the production tubing 16 to the surface. In the event that gas is produced in the well, the gas passes up conduit 33 into the annular space 25 between the well casing 10 and the tubing 16 and from there it rises to the surface.

Figure 2:
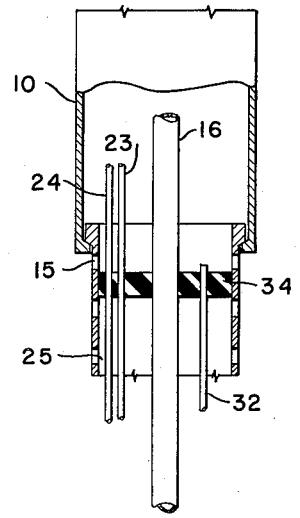
Figure 2 is a diagrammatic view, taken in partial cross-section, of an alternative arrangement of the packer assembly of Figure 1.

In the event that no gas is being produced in the well, a single packer 34 (Figure 2) may be employed to close the annular space 25 between the production tubing 16 and the well casing 10. In this arrangement a column of well fluid would build up in the annular space 25 until the hydrostatic head of the annular column of fluid was sufficient to force the heated fluid through perforations 15 into the adjacent oil-producing formation.

Figure 3:
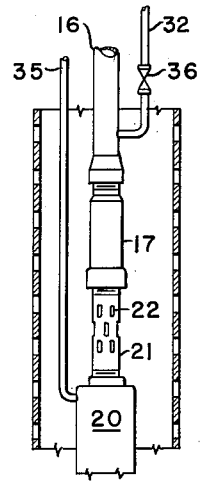
Figure 3 is a diagrammatic view, taken in longitudinal section, of another arrangement of a portion of the apparatus shown in Figure 1.

In the arrangement shown in Figure 3, an electric heater 20 is supplied by current through a transmission cable 35. In this arrangement the pump 17 acts as both the pump for forcing the larger portion of well fluid up the production tubing 16 while at the same time forcing a portion of the heated fluid up conduit 32 to the space between the packers 30 and 31 (Figure 1). In this latter arrangement a valve 36 may be provided in the conduit 32 so as to control the amount of fluid recirculated up conduit 32 while the well is being produced. Alternatively, instead of using a valve 36, the conduit 32 may be selected with a diameter such that only a portion of the produced fluid could be forced through it. While the invention has been described with regard to electric and hot-water borehole heaters, it is apparent that any suitable type of heater could be employed. Also, while it is more economical to employ a recirculating pump and a downhole heater that are powered from the same power source, it is quite apparent, if desired, heaters and recirculating pumps with different power sources could be employed.

I claim as my invention:

1. Apparatus for heating oil formations and recovering oil therefrom, said apparatus comprising an oil well casing positioned within a well traversing at least one oil-producing formation, said casing have perforations through the wall thereof at a level adjacent said oil-producing formation, fluid heat exchange means disposed within said well casing near the lower part of one of said producing formations for heating well fluid therein, transmission means comprising fluid conduit means operatively connected to said heat exchange means and extending upwardly to the well head for circulating a heating fluid to said heat exchange means and up to the well head again, an oil production tubing positioned within said well casing and extending downwardly therein, an oil well pump connected to the lower end of said production tubing and positioned in the well fluid within the well casing, a recirculating pump disposed in the heated well fluid within said well casing, the intakes of said pumps being below the oil level within said well casing, means in the path of said circulating fluid for operating said recirculating pump, double packer means set in the annular space between the production tubing and the perforate well casing near but below the top of the oil-producing formation, and conduit means connecting the recirculating pump discharge with the space between said double packer means.

2. Apparatus for heating oil formations and recovering oil therefrom, said apparatus comprising an oil well casing positioned within a well traversing at least one oil-producing formation, said casing having perforations through the wall thereof at a level adjacent said oil-producing formation, electrical heating means disposed within said well casing near the lower part of one of said producing formations for heating well fluid therein, electrical transmission means operatively connected to said heating means and extending upwardly to the well head for supplying current to said heating means, an oil production tubing positioned within said well casing and extending downwardly therein, an oil well pump connected to the lower end of said production tubing and positioned near the bottom of said perforated well casing, a recirculating pump disposed adjacent said heating means within said well casing, electrical transmission means operatively connected to said recirculating pump and extending upwardly to the well head for supplying current to said pump, the intakes of said pumps being below the oil level within said well casing, double packer means set in the annular space between the production tubing and the perforated well casing near but below the top of the oil-producing formation, conduit means connecting the recirculating pump discharge with the space between said double packer means, and gas conduit means extending through said double packer means in communication between the annular spaces above and below said double packer means.

References Cited in the file of this patent

UNITED STATES PATENTS

| | | |
|---|---|---|
| 1,354,757 | Popcke et al. | Oct. 5, 1920 |
| 1,612,611 | Claytor | Dec. 28, 1926 |
| 2,742,091 | Rotherham | Apr. 17, 1956 |
| 2,742,967 | Carpenter | Apr. 24, 1956 |
| 2,813,584 | Teplitz | Nov. 19, 1957 |
| 2,874,777 | Tadema | Feb. 24, 1959 |